Patented Oct. 2, 1951

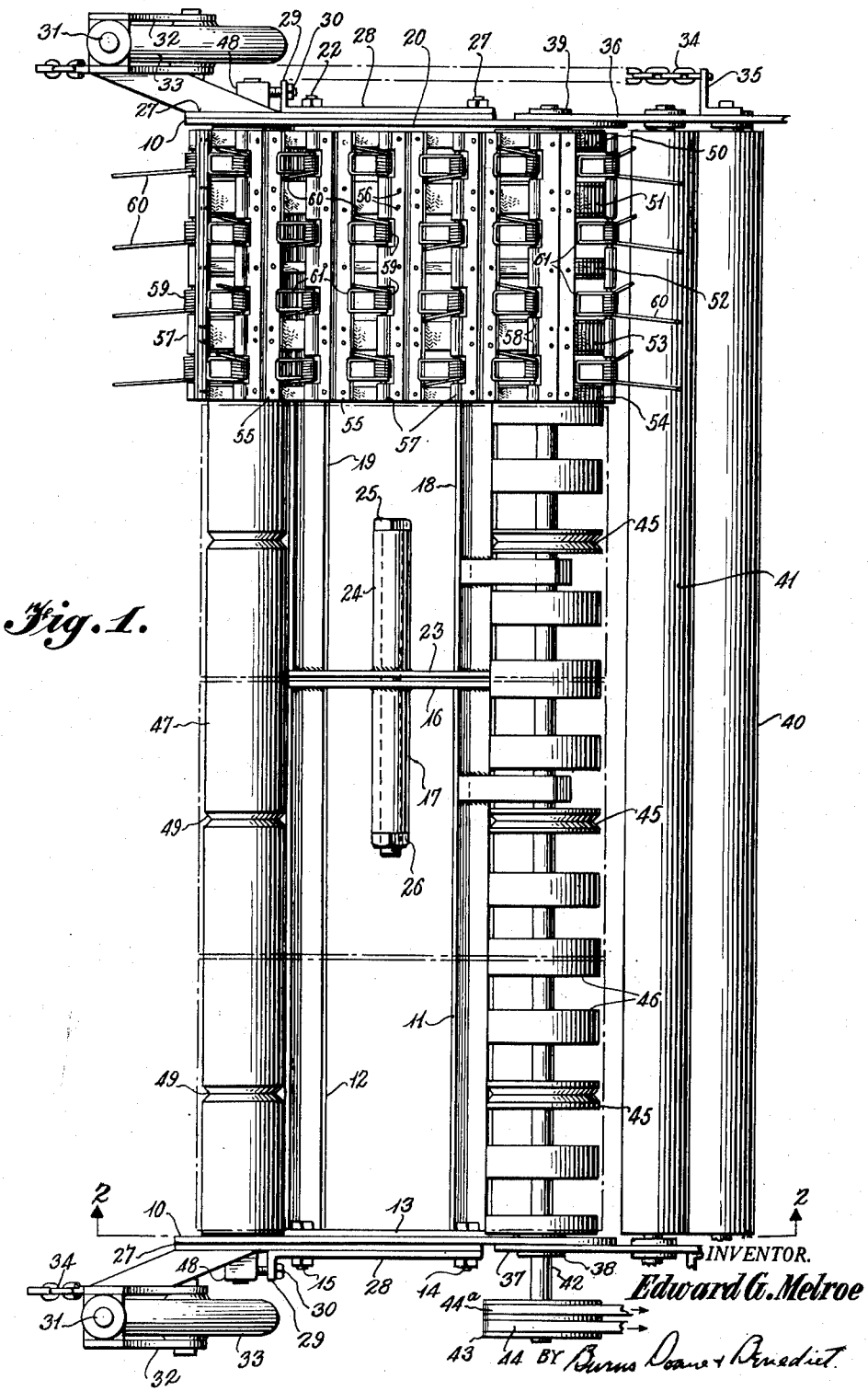

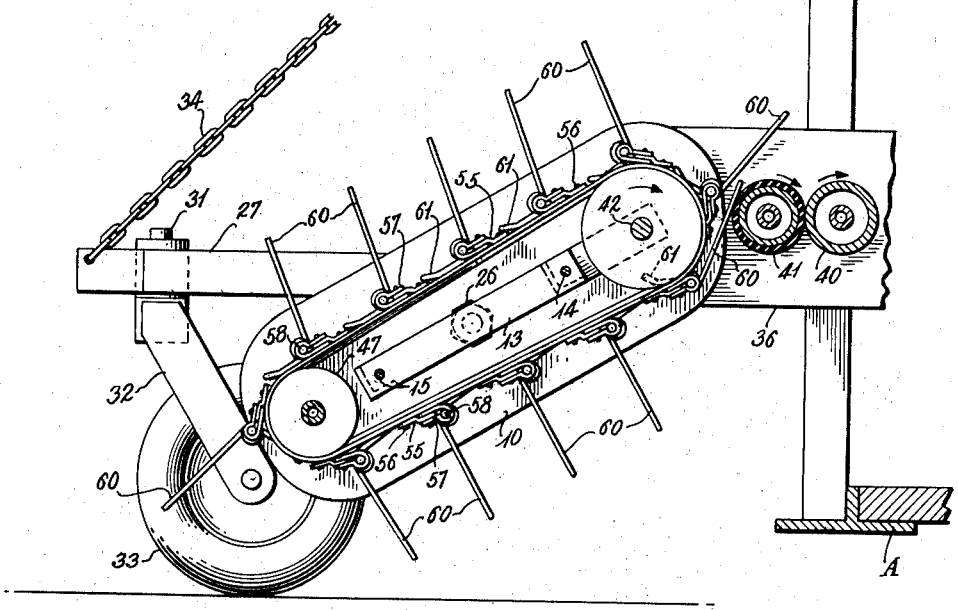
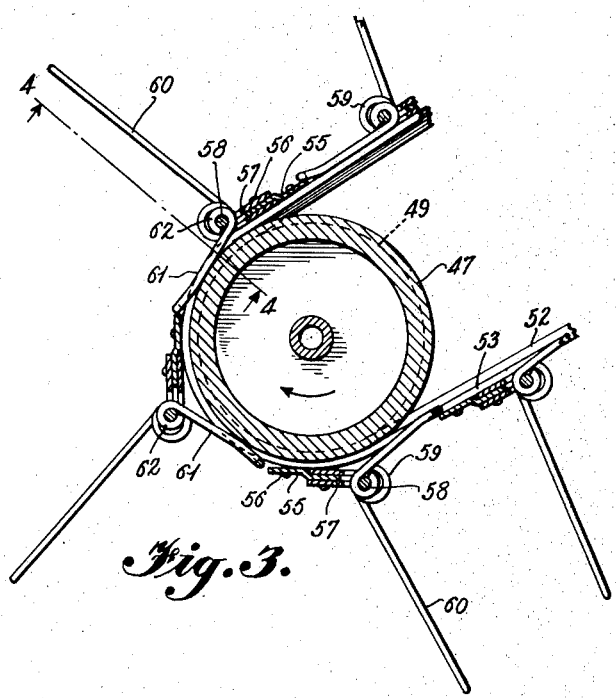
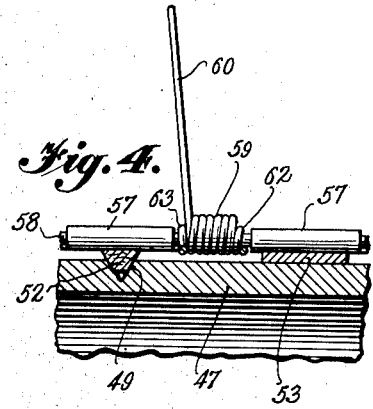

2,570,065

UNITED STATES PATENT OFFICE 2,570,065

PICKUP DEVICE FOR HARVESTERS

Edward G. Melroe, Gwinner, N. Dak.

Application May 18, 1949, Serial No. 93,990

7 Claims. (Cl. 198—197)

The present invention relates to a pick-up device for moving harvesters, conventionally known as combines.

Pick-up devices for moving harvesters are positioned in advance of and secured to the harvester frame in such manner as to pick up unthreshed grain, and other seed bearing straw and hay like material, from windrows in the field and deliver the same to the operating mechanism of the harvester.

Various types of pick-up devices of this general character have heretofore been provided, exemplary of which are the devices of applicant's own prior United States Patent Numbers 2,253,797 and 2,385,829.

It is the purpose and the object of the present invention to provide an improved form of pick-up device for moving harvesters, which will insure against the delivery of rocks and stones into the working part of the traveling harvester, which can be maintained free of accumulations of entangling material such as morning glory vines, bind weed and the like, and which embraces pivotally mounted teeth that are highly effective in use.

Further and more detailed objects of the invention will be made apparent as the description thereof proceeds. The invention will be described by reference to the accompanying drawings, in which Fig. 1 is a top plan view of the pick-up device with certain parts broken away and sections of the endless conveyor removed to facilitate an understanding of the operating parts.

Fig. 2 is a sectional view along the line 2—2 of Fig. 1,

Fig. 3 is a detailed cross sectional view through the idler roller showing the position of the teeth carried by the endless conveyor as they pass over the idler roller, and Fig. 4 is a detailed sectional view on the line 4—4 of Fig. 3.

Referring to Fig. 1, the moving harvester pick-up device embraces opposed end frame members 10. These end frame members 10 are arranged to be secured together in proper spaced relation by a two-part skeleton frame, the right hand end of which as seen in Fig. 1 embraces the angle irons 11 and 12, which are secured at one end to a cross bar 13 which is in turn bolted to one of the frame members 10 by bolts 14 and 15. The opposite ends of the angle bars 11 and 12 are welded to a transverse bar 16 which has welded thereon a tubular member 17. The left hand end of the skeleton frame, as seen in Figure 1, embraces the angle iron members 18 and 19, similar respectively to the angle iron members 11 and 12. One end of the angle bars 18 and 19 is secured to and bridged by a cross bar 20, similar in all respects to the bar 13. The bar 20 is in turn bolted to the left hand frame member 10 by bolts 21 and 22. The opposite ends of the angle bars 18 and 19 are welded to a cross bar 23, similar in all respects to the bar 16 and the bar 23 has welded thereto a tubular member 24, similar to the tubular member 17.

After the right and left hand ends of the skeleton frame have been assembled with their respective end members 10, the bars 16 and 23 are brought together with the tubular members 17 and 24 in alignment and the connecting bolt 25 is passed through the tubular members 17 and 24 and the nut 26 threaded thereon to hold the two-part skeleton frame together. The arrangement is such that the joint between the two-part skeleton frame will yield under torsional strain and avoid breaking thereof.

Caster wheel brackets 27 are adapted to be secured to each frame member 10, the caster wheel bracket 27 at the right hand end of the pick-up device being held in position by the bolts 14 and 15, and the companion caster bracket 27 at the left hand of the pick-up device being held in position by the bolts 21 and 22. Complemental brackets 28, one for each end of the device, are also secured to the end frame members 10. Each of the brackets 28 is provided with a projecting ear 29, having a threaded opening for receiving a belt tightening bolt member 30, the purpose of which will be hereinafter described. Each of the caster brackets 27 carries a vertical caster 31 to which is affixed a yoke 32 for the caster wheels 33, which are adapted to run on the ground and support the lower forward end of the pick-up device as will be seen by reference to Figure 2.

A stay chain 34 is adapted to be connected to the free end of each caster bracket 27 and to extend back and be anchored to uprights 35 on the harvester frame.

The frame heretofore described and having the end members 10 is adapted to be received between the plates 36 and 37, which in turn are rigidly secured to the uprights 35 on the harvester frame A. Suitable bearings are provided at 38 and 39 so that the frame having end members 10 is free to swing up and down in its mounting between the plates 36 and 37. Rollers 40 and 41 are journalled in the plates 36 and 37. It is preferred that roller 41 be rubber covered so as to have a yieldable and somewhat adherent surface, whereas roller 40 may be a metal roller. The rollers 40 and 41 are driven in a manner to give them a direction of movement as indicated by the arrows in Figure 2.

A drive shaft 42 extends through the bearings 38 and 39 in the end members 10 of the main frame of the pick-up device. The shaft 42 carries the drive pulley 43 for receiving the belts 44, which is powered from the harvester. A second belt 44a is mounted on pulley 43 and serves to drive rollers 40 and 41 in a clockwise direction by pulleys (not shown). The shaft 42 carries V-pulleys 45 at suitably spaced intervals as well as a plurality of spaced apart flat faced pulleys indicated generally at 46. An idler roller 47 is mounted between the end members 10 in suitable bearings 48, positioned for limited longitudinal movement with respect to the frame members 10 in response to movement of the belt tightening bolts 30. For each V-pulley 45 on the shaft 42 there is provided a corresponding V-groove 49 in the idler roller 47.

It will be appreciated that the shaft 42 and its associated V-pulleys 45 and flat faced pulleys 46 together constitute the drive roller for the pick-up device.

A sectional endless conveyor is trained over the driving and idler rollers of the device. Since the several sections of the endless conveyor are duplicative of one another, only one such section is shown in Figure 1. Each section of the endless conveyor is made up of a plurality of spaced apart individual belts designated by reference characters, 50, 51, 52, 53 and 54 (Fig. 1). It will be observed that the belt 52 is a V-belt and that it is positioned midway of the length of the section of the endless conveyor with which it is associated. The belts 50 to 54 inclusive, while constituting individual spaced apart belts are connected together to move as a single belt by the parallel transverse metal strips 55. Each strip 55 is secured adjacent its leading edge to each of the spaced apart belts 50 to 54 inclusive by suitable rivets or the like 56. Each strip 55 has secured to its trailing edge a plurality of spaced apart tubular bearings 57 (see Fig. 4), that is, one such bearing 57 for and in alignment with each of the belts 50 to 54 inclusive. While the individual belts 50 to 54 inclusive are shown as continuous belts in the drawings, it will be appreciated that each belt may be made up of sections hingedly connected together so as to provide when assembled an uninterrupted endless conveyor. It is desirable to provide the hinged connections for the separate belts in horizontal alignment so that by removing the hinge pins the conveyor section may be removed as a unit. The arrangement is such that the spaces between the belts and the spaces between the bearings 57 coincide. A bar 58 is adapted to extend through each set of bearings 57, it being understood that there is a set of bearings 57 and an accompanying rod 58 positioned at the trailing edge of each of the transverse strips 55. The trailing edge of each of the transverse strips 55 and its accompanying set of bearings 57 and rod 58 is free to have limited movement away from the working face of the belts 50 to 54 inclusive and to partake of such movement as the endless conveyor moves over the driving and idler rollers.

A spring tooth indicated generally at 59 (Fig. 4) is mounted on the rods 58 in each space between the bearings 57. Each spring tooth 59 embraces two angularly extending portions 60 and 61. The angularly extending portion 60 constitutes a single flexible steel spring wire of proper gauge. The angular portion 61 is preferably shorter than the angular portion 60 and takes the form of a U-shaped extension of the steel spring wire from the coiled portion of the tooth 59. It will be observed that each tooth 59 is comprised of a single length of spring steel wire, which is coiled intermediate its length in such manner as to pass over the bar 58. The angularly disposed portion 61 is adapted to be drawn closely about the bar 58 as shown at 62 and 63 (Fig. 4) to provide a bearing for the tooth 59 having but little play therein while leaving a relatively large coil between the small coils 62 and 63 to absorb shock and prevent breakage of the tooth.

Coming now to a description of the operation of the device and referring more particularly to Figures 2 and 3, it will be observed that the shaft 42 and its associated V-pulleys 45 and flat faced pulleys 46 rotate in a clockwise direction and drive the endless conveyor. The teeth 60 pick up the grain and the like from the windrow, carry it up and discharge it on to the harvester frame to the rear of the rollers 40 and 41. The spacing of the transverse strips 55 and the length of the angularly disposed portions 61 of the teeth 59 is such that the angularly disposed portion 61 bridges the space between the trailing edge of the strip by which any given tooth 59 is carried, and the leading edge of the next succeeding strip 55 of the endless conveyor. By reference to Figure 2, it will be observed that when the outwardly projecting portions 60 of the teeth are under load, the angularly disposed portions 61 of these teeth have their free ends resting on the leading edge of the next succeeding transverse strip 55. Thus the teeth 60 are firmly held in operative position when under load. When the outwardly projecting portion 60 of teeth 59 discharge their load onto the harvester frame, they pass down around the pulleys 45 and 46 carried by the shaft 42 and in so doing the bearings 57 and rod 58 are free to move slightly away from the belts 50 to 54 inclusive, thus opening up the space between adjacent transverse strips 55. As the outwardly projecting portions 60 of the teeth 59 pass downwardly, they contact the roller 41 which serves to free the teeth from any entangled material such as morning glory vines, bind weed and the like. Additionally the contact of the outwardly projecting portions 60 of the teeth 59 with the roller 41 forces the angularly projecting portions 61 of the teeth 59 inwardly or to the back face of the conveyor, which action is permitted because the angularly projecting portions 61 of the teeth 59 is so positioned as to coincide with the spacing between adjacent belts of the series 50 to 54 inclusive. Thus on the return or unloaded run of the endless conveyor, the outwardly projecting portions 60 of the teeth 59 are free to swing backwardly thus insuring that they will not be broken or mutilated on contact with an obstruction or the like.

As the strips 55 move around the idler roller 47 their trailing edges embracing the bearings 57 and rods 58 again move outwardly from the belts 50 to 54 inclusive, thus again opening up the space between adjacent strips 55. Since the roller 47 is a continuous one, the surface of this roller acts to force the angularly extending portions 61 of the teeth 59 outwardly between adjacent strips 55 so that such angular portions 61 of the teeth 59 again occupy a position on the working face of the endless conveyor and function by contact with the leading edges of the strips 55 to lock the teeth against rearward pivotal movement.

The teeth 59 may either be right hand or left hand, that is, the outwardly projecting portion 60 may extend from the right hand end of the tooth 59 or alternatively from the left hand end of the tooth 59. The manner of construction of the tooth and mode of operation are the same whether it be a left hand tooth or a right hand tooth.

It is, however, a desirable feature of the invention to provide the juxtaposed rows of teeth in such manner that the outwardly projecting portions 60 thereof will be positioned in staggered relation, as shown in Figure 1. The single outwardly projecting portions 60 of the teeth have significant yielding action in any direction, and since they contact the windrow and occasionally the ground as single straight yielding elements, they do not have a tendency to pick up, or even throw, rocks and pebbles into the windrow. Furthermore, due to the extreme skeletonized nature of the frame and of the endless conveyor of the pick-up device, small pebbles and stones are permitted to fall through the conveyor in the remote possibility that they would be carried on to the conveyor with the material being handled.

The foregoing description has been given by way of illustration and not in limitation of the invention, which is defined by the accompanying claims.

I claim:

1. A pick-up device for a travelling harvester comprising a frame embracing a pair of spaced parallel rollers, an endless conveyor trained about said rollers, said conveyor embracing a plurality of spaced apart individual belts secured together to move as a single belt by substantially rigid transverse strips secured to said belts forwardly of their trailing edges so that the trailing edges of said transverse strips are free to move away from said belts as they pass around either the driven or idler rollers, spring teeth pivotally mounted on the trailing edges of said strips, each of said teeth formed with an outwardly projecting portion and a second portion adapted to bridge the space between the strip on which any one of said teeth is mounted and the next succeeding strip in the flat runs of the conveyor, and free to move between the strip on which any given tooth is mounted and the next succeeding strip as said last mentioned strips pass about either of said rollers.

2. A pick-up device for a travelling harvester comprising a frame embracing a pair of spaced parallel rollers, an endless conveyor trained about said rollers, said conveyor embracing a plurality of spaced apart individual belts secured together to move as a single belt by substantially rigid transverse strips secured to said belts forwardly of their trailing edges so that the trailing edges of said transverse strips are free to move away from said belts as they pass around either the driven or idler rollers, spring teeth pivotally mounted on the trailing edges of said strips, each of said teeth formed with an outwardly projecting portion and a second portion adapted to bridge the space between the strip on which any one of said teeth is mounted and the next succeeding strip in the flat runs of the conveyor, and free to move between the strip on which any given tooth is mounted and the next succeeding strip as said last mentioned strips pass about either of said rollers, one of said rollers embracing a plurality of spaced pulleys, one for each of said spaced belts.

3. A pick-up device for a travelling harvester comprising a frame embracing a pair of spaced parallel rollers, an endless conveyor trained about said rollers, said conveyor embracing a plurality of spaced apart individual belts secured together to move as a single belt by spaced substantially rigid transverse strips, certain of said transverse strips carrying means for pivotally supporting thereon spring teeth in the spaces between said spaced apart belts, spring teeth pivotally supported on said supporting means, each of said spring teeth formed with two angularly disposed portions one of which projects from the conveyor as a working tooth and the other of which bridges the space between two adjacent transverse strips when in the flat runs of the conveyor, and which is free to pass to the back face of the endless conveyor as said adjacent strips move over one of said rollers and return to the front face of the endless conveyor as said adjacent strips move over the other of said rollers.

4. A pick-up device for a travelling harvester comprising a frame embracing a pair of spaced parallel rollers, an endless conveyor trained about said rollers, said conveyor embracing a plurality of spaced apart individual belts secured together to move as a single belt by spaced substantially rigid transverse strips, certain of said transverse strips carrying means for pivotally supporting thereon spring teeth in the spaces between said spaced apart belts, spring teeth pivotally supported on said supporting means, each of said spring teeth formed with two angularly disposed portions one of which projects from the conveyor as a working tooth and the other of which bridges the space between two adjacent transverse strips when in the flat runs of the conveyor, and which is free to pass to the back face of the endless conveyor as said adjacent strips move over one of said rollers and return to the front face of the endless conveyor as said adjacent strips move over the other of said rollers, one of said rollers embracing a plurality of spaced pulleys, one for each of said spaced belts.

5. A pick-up device for a travelling harvester comprising a frame embracing a driven roller and an idler roller, an endless conveyor trained about said rollers, said conveyor embracing a plurality of spaced apart individual belts secured together to move as a single belt by spaced substantially rigid transverse strips, said strips being secured to said belts adjacent their leading edges and carrying at their trailing edges means for pivotally supporting spring teeth between spaced apart belts, the arrangement being such that said pivotal supporting means carried at the trailing edge of each strip is free to move outwardly a limited distance from said belts as the same pass around either the driven or the idler roller, spring teeth each formed with two angularly disposed portions pivotally supported on said supporting means between said spaced belts with the longer of the two angularly disposed portions projecting outwardly from the conveyor as a working tooth and the shorter of said angularly disposed portions bridging the space between the trailing edge of the strip on which any one of said teeth is carried and the leading edge of the next succeeding strip in the flat runs of the conveyor, said shorter angularly disposed portions of said teeth being free to move to the back face of the endless conveyor as the teeth pass over the driven roller and returned to the front of the conveyor as the teeth pass over the idler roller.

6. A pick-up device for a travelling harvester comprising a frame embracing a driven roller and an idler roller, an endless conveyor trained about said rollers, said conveyor embracing a plurality of spaced apart individual belts secured together to move as a single belt by spaced substantially rigid transverse strips, said strips being secured to said belts adjacent their leading edges and carrying at their trailing edges means for pivotally supporting spring teeth between spaced apart belts, the arrangement being such that said pivotal supporting means carried at the trailing edge of each strip is free to move outwardly a limited distance from said belts as the same pass around either the driven or the idler roller, spring teeth each formed with two angularly disposed portions pivotally supported on said supporting means between said spaced belts with the longer of the two angularly disposed portions projecting outwardly from the conveyor as a working tooth and the shorter of said angularly disposed portions bridging the space between the trailing edge of the strip on which any one of said teeth is carried and the leading edge of the next succeeding strip in the flat runs of the conveyor, said shorter angularly disposed portions of said teeth being free to move to the back face of the endless conveyor as the teeth pass over the driven roller and returned to the front of the conveyor as the teeth pass over the idler roller, said driven roller embracing a plurality of spaced pulleys, one for each of said spaced belts.

7. A pick-up device for a travelling harvester comprising a frame embracing a driven roller and an idler roller, an endless conveyor trained about said rollers, said conveyor embracing a plurality of spaced apart individual belts secured together to move as a single belt by spaced substantially rigid transverse strips, said strips being secured to said belts adjacent their leading edges and carrying at their trailing edges means for pivotally supporting spring teeth between said spaced apart belts, the arrangement being such that said pivotal supporting means carried at the trailing edge of each strip is free to move outwardly a limited distance from said belts as the same pass around either the driven or the idler roller, spring teeth each formed with two angularly disposed portions pivotally supported on said supporting means with the longer of the two angularly disposed portions projecting outwardly from the conveyor as a working tooth and the shorter of said angularly disposed portions bridging the space between the trailing edge of the strip on which the tooth is carried and the leading edge of the next succeeding strip in the flat runs of the conveyor, said shorter angular portion of each tooth being free to move to the back face of the endless conveyor as the teeth pass over the driven roller and returned to the front face of the endless conveyor as the teeth pass over the idler roller, and means arranged in the path of the outwardly projecting portions of said teeth in juxtaposition to said driven roller to free the teeth from any entangled material carried thereby and to insure the movement of the shorter angular portions of said teeth to the back face of the endless conveyor.

EDWARD G. MELROE.

REFERENCES CITED

The following references are of record in the file of this patent:

UNITED STATES PATENTS

| Number | Name | Date |
| --- | --- | --- |
| 675,703 | Allen | June 4, 1901 |
| 956,520 | Frose | May 3, 1910 |
| 2,385,829 | Melroe | Oct. 2, 1945 |